United States Patent [19]

Martin

[11] Patent Number: 5,747,407
[45] Date of Patent: May 5, 1998

US005747407A

[54] METHOD OF MAKING A ZIEGLER-NATTA OLEFIN POLYMERIZATION CATALYST

[75] Inventor: Joel L. Martin, Bartlesville, Okla.

[73] Assignee: Phillips Petroleum Company, Bartlesville, Okla.

[21] Appl. No.: 705,367

[22] Filed: Aug. 29, 1996

[51] Int. Cl.⁶ .............................. B01J 31/00; B01J 37/00; C08F 4/02; C08F 4/60
[52] U.S. Cl. ............... 502/26; 502/103; 502/104; 502/107; 502/113; 502/117; 502/118; 502/119; 502/132; 502/134; 526/119
[58] Field of Search ................................ 502/134, 132, 502/126, 118, 119

[56] References Cited

U.S. PATENT DOCUMENTS

| | | | |
|---|---|---|---|
| 3,888,835 | 6/1975 | Ito et al. | 502/126 |
| 4,287,093 | 9/1981 | Gilbert | 502/126 |
| 4,325,837 | 4/1982 | Capshew et al. | 252/429 B |
| 4,326,988 | 4/1982 | Welch et al. | 252/429 B |
| 4,363,746 | 12/1982 | Capshew | 252/429 B |
| 4,504,637 | 3/1985 | Shiga et al. | 502/134 |
| 4,701,505 | 10/1987 | Fujii et al. | 502/126 |
| 4,978,648 | 12/1990 | Barbe et al. | 502/134 |
| 5,068,213 | 11/1991 | Albizzati et al. | 502/134 |
| 5,212,132 | 5/1993 | Spitz et al. | 502/134 |
| 5,492,984 | 2/1996 | Brems et al. | 526/125.8 |
| 5,633,419 | 5/1997 | Spencer et al. | 502/134 |

*Primary Examiner*—Glenn Caldarola
*Assistant Examiner*—J. Pasterczyk
*Attorney, Agent, or Firm*—Lucas K. Shay

[57] ABSTRACT

A composition which can be used in, for example, slurry polymerization of an olefin such as, for example, ethylene is produced by a process comprising: (1) combining a first transition metal compound and a metal halide to form a solution; (2) contacting the solution with a precipitating agent to form a solid catalyst intermediate; (3) contacting the solid catalyst intermediate with a second transition metal compound to produce a catalyst composition; and optionally (4) depositing a prepolymer onto the catalyst composition. The precipitating agent comprises a sufficient amount of both a Lewis acid and an ether to effect the precipitation of a solid. Also disclosed is the use of the composition in polymerization of an olefin.

43 Claims, No Drawings

METHOD OF MAKING A ZIEGLER-NATTA OLEFIN POLYMERIZATION CATALYST

FIELD OF THE INVENTION

The present invention relates to an olefin polymerization catalyst composition, a process for producing the composition, and a process for using the composition for the polymerization of olefins.

BACKGROUND OF THE INVENTION

Numerous polyolefin polymerization catalysts have been developed since the initial discoveries of Ziegler and Natta regarding the use of transition metal compounds as catalysts for olefin polymerization. Various techniques of polymerizing olefins have also developed. Specifically, olefins can now be polymerized under gas phase conditions, solution conditions, and slurry conditions. Under the solution conditions, the polymerization is carried out at temperatures such that the formed polymer remains dissolved in the polymerization diluent. The polymer is then recovered by evaporating the diluent to recover the formed polymer. In slurry polymerizations, on the other hand, the polymerization is conducted under conditions such that the end product polymer is not dissolved in the polymerization diluent. The slurry polymerization has an advantage in that it eliminates the utility requirements that accompany the separation of diluent from the polymer in the solution processes.

The aforementioned catalysts may be useful for particular types of polymerizations. The catalysts of the present invention are particularly useful for slurry polymerizations.

Slurry polymerizations are often conducted in a continuous loop reactor wherein monomer, catalyst, and diluent are continuously fed to the loop and solid polymer that is produced is allowed to settle out and periodically withdrawn from the loop. In such continuous slurry type polymerizations, factors other than activity and selectivity should be and are of interest to those skilled in the art. For example, in the slurry processes it is desirable to have a catalyst which does not form substantial amounts of soluble polymer since the soluble polymer tends to coat the surfaces inside the reactor and thus interfere with needed heat transfer. In addition, it is desirable to have a catalyst in a slurry polymerization which produces relatively high bulk density because the handling of the produced solid polymer becomes impractical if the bulk density is too low. It is also an advantage to have the polymer produced in the form of particles that are relatively free of fines, because fines do not settle as well as larger particles and present additional handling problems during processing of the polymer fluff.

Some catalysts suitable for olefin polymerization can be produced by a process in which a metal halide such as, for example, $MgCl_2$ is reacted with a transition metal compound such as, for example, titanium tetraethoxide, to form a solution. The solution is then treated with a precipitating agent such as, for example, an aluminum alkyl to form a solid. The solid is then treated with, for example, a titanium compound to produce an olefin polymerization catalyst. The problems with the process is the high rate of precipitation when the solution is treated with a precipitating agent. That is, the resulting solid is so insoluble that changes in temperature and rate of addition of a precipitating agent provide little or no control over the particle shape and/or size of the precipitated solid. Generally, high rate of precipitation produced solids having irregular shapes and small particle sizes which are not desirable. For example, it is known to those skilled in the art that catalysts having small particle sizes cause problems in down stream processes such as, for example, recovery of the polymers.

Therefore, there is an ever-increasing need for improving processes for producing olefin polymerization catalysts. Development of such improved processes would also be a significant contribution to the art.

SUMMARY OF THE INVENTION

An object of the present invention is to provide a catalyst composition that is particularly suitable for use in slurry polymerization. Another object of the present invention is to provide a process for producing the composition. A further object of the present invention is to provide a process for olefin polymerization employing the composition. An advantage of the present invention is that an olefin polymerization catalyst having desired particle size and shape such as, for example, near spherical particles, can be obtained. Also an advantage of the present invention is that olefin polymers produced by the invention process have high bulk densities.

According to the present invention, a process for producing a solid olefin polymerization catalyst composition is provided. The process can comprise, consist essentially of, or consist of (1) combining a first transition metal compound and a metal halide to form a solution; (2) contacting the solution with a precipitating agent to form a solid catalyst intermediate; and (3) contacting the solid catalyst intermediate with a second transition metal compound to produce a catalyst composition. The precipitating agent comprises, consists essentially of, or consists of a sufficient amount of both a Lewis acid and an ether to effect the precipitation of a solid which has a more spherical shape and large particle size than a solid precipitated without an ether in the precipitating agent.

The resulting solid transition metal-containing catalyst composition can then be used for olefin polymerization, generally in combination with an organometallic cocatalyst.

DETAILED DESCRIPTION OF THE INVENTION

According to the process of the invention, the first step of the invention is combining a first transition metal compound in a solvent and a metal halide compound to form a solution.

According to the present invention, any metal halide compound and transition metal compound that can effect the preparation of an olefin polymerization catalyst can be used. Preferably, the metal halide compound is selected from metal dihalides and metal hydroxyhalides and the metal thereof is selected from Group IIA and Group IIIB metals of the Mendeleev Periodic Table and wherein the transition metal of the transition metal compound is selected from Group IVB and Group VB transition metals of the Mendeleev Periodic Table and the transition metal is bonded to at least one atom selected from oxygen, nitrogen and sulfur, and the oxygen, nitrogen and sulfur atoms are in turn bonded to a carbon atom of a carbon containing radical. Also suitable for use in the present invention are manganese dihalides and lanthanide trihalides. As used herein the term "Mendeleev Period Table" denotes the Periodic Table of the Elements as shown in the inside front cover of Perry, *Chemical Engineer's Handbook*, 4th Edition, McGraw Hill & Co. (1963).

As noted above the metal of the metal halide compound is selected from the group consisting of Group IIA and Group IIIB metals, such as for example beryllium, magnesium, calcium, manganese, scandium, yttrium, and lanthanides. Some suitable metal halide compounds include, but are not limited to, beryllium dichloride, beryllium dibromide, beryllium hydroxyiodide, magnesium dichloride, magnesium bromide, magnesium hydroxychloride, scandium trihalides, yttrium trihalides, magnesium diiodide, calcium dichloride, calcium dibromide, calcium hydroxybromide, manganese dichloride, manganese dibromide, manganese diiodide, manganese hydroxychloride, and combinations of any two or more thereof. Of the metal dihalides, magnesium dihalides, and particularly magnesium dichloride is preferred because it is readily available, effective in preparing an olefin polymerization catalyst, and relatively inexpensive.

The metal halide compound is generally used in the form of any anhydrous, particulate solid to facilitate its contacting, or combining, or reaction with the transition metal compound. It is also noted that various techniques for converting a metal halide compound to a fine particulate form, such as, for example, roll milling and reprecipitating can be used to prepare the metal halide compound for use according to the present invention.

The transition metal of the first transition metal compound noted above can be selected from the group consisting of Group IVB and Group VB transition metals and is generally selected from the group consisting of titanium, zirconium, vanadium, and combinations of any two or more thereof although other transition metals can be employed. Some of the titanium compounds suitable for use in the invention include, but are not limited to, titanium tetrahydrocarbyloxide, titanium tetraamides, titanium tetramercaptides, and combinations of any two or more thereof. Other transition metal compounds include, but are not limited to, zirconium tetrahydrocarbyloxides, zirconium tetraamides, zirconium tetramercaptides, vanadium tetrahydrocarbyloxides, vanadium tetraamides, vanadium tetramercaptides, and combinations of any two or more thereof.

A titanium tetrahydrocarbyloxide is the presently preferred first transition metal compound because they are readily available and effective. Suitable titanium tetrahydrocarbyloxide compounds include those expressed by the general formula Ti(OR)$_4$ wherein each R is individually selected from an alkyl, cycloalkyl, aryl, alkaryl, and aralkyl hydrocarbon radical containing from 1 to about 30, preferably 1 to about 20 carbon atoms per radical and each R can be the same or different. Titanium tetrahydrocarbyloxides in which the hydrocarbyl group contains from 1 to about 10 carbon atoms per radical which is a linear alkyl radical are most preferred because they are more readily available and are effective in forming the solution. Suitable titanium tetrahydrocarbyloxides include, but are not limited to, titanium tetramethoxide, titanium dimethoxydiethoxide, titanium tetraethoxide, titanium tetra-n-butoxide, titanium tetrahexyloxide, titanium tetradecyloxide, titanium tetraeicosyloxide, titanium tetracyclohexyloxide, titanium tetrabenzyloxide, titanium tetratolyloxide, titanium tetraphenoxide, and combinations of any two or more thereof.

Of the titanium tetrahydrocarbyloxides, titanium tetraalkoxides are generally preferred and titanium tetraethoxide is particularly preferred because of its availability and cost.

Any molar ratio of the first transition metal compound to the metal halide compound can be employed so long as the molar ratio can effect the production of an olefin polymerization catalyst and can be selected over a relatively broad range. Generally the molar ratio is in the range of about 0.01:1 to about 100:1, preferably about 0.1:1 to about 10:1, and most preferably 0.5:1 to 3:1. When titanium tetrahydrocarbyloxide and magnesium dichloride are employed to form a solution, a molar ratio of titanium to magnesium of about 2:1 is presently preferred as all the magnesium compound apparently goes into solution easily.

The metal halide compound and the first transition metal compound employed in the present invention are normally mixed together by heating such as, for example, refluxing these two components together in a suitable dry (essential absence of water) solvent or diluent, which is essentially inert to these components and the product produced. The term "inert" denotes that the solvent does not chemically react with the dissolved components such as to interfere with the formation of the product or the stability of the product once it is formed. Such solvents or diluents include, but are not limited to, diethyl ether, di-n-propyl ether, di-n-butyl ether, n-hexane, cyclohexane, n-pentane, n-heptane, methylcyclohexane, toluene, xylenes, halogenated solvents such as, for example, dichloromethane, chlorobenzene, chloroform, 1,2-dichloroethane, and combinations of any two or more thereof. The mixing temperatures are generally the range of from about −10° C. to about 200° C., preferably 0° C. to about 150° C., and preferably from about 15° C. to about 120° C.

Generally the amount of solvent or diluent employed can be any amount that can substantially dissolve the metal halide compound and the first transition metal compound and can be selected over a broad range. Usually the amount of solvent or diluent is within the range of about 20 to about 100 ml per gram of metal dihalide. The temperature employed during the heating step can also be selected over a broad range so long as a solution can be formed. Normally the heating temperature is within the range of about 15° C. to about 200° C., preferably about 20° to about 150° C., and most preferably 30° to 120° C. when the heating step is carried out at atmospheric pressure. The pressure employed during the heating step does not appear to be a significant parameter and can be in the range of from about 0.5 to about 10 atmospheres.

Generally, the time required for heating these two components together is within the range of about 5 minutes to about 10 hours, although in most instances a time within the range of about 15 minutes to about 3 hours is sufficient. Following the heating operation, the resulting solution can be filtered to remove any undissolved material or extraneous solid, if desired. The composition thus produced and which is in solution can be recovered from the solvent or diluent by crystallization or other suitable means.

Additionally, the compositions are preferably prepared in the absence of air as well as in a dry system. Generally a dry box can be employed as known in the art to prepare the composition.

The resulting solution is then contacted with a precipitating agent. Generally any precipitating agent known to one skilled in the art can be used so long as the precipitating agent can effect the production of an olefin polymerization catalyst intermediate having the physical characteristics disclosed hereinabove. Suitable precipitating agent preferably comprises, consists essentially of, or consists of a Lewis acid and an ether. A suitable Lewis acid includes, but is not limited to, BCl$_3$, phosphorus oxychloride (POCl$_3$), titanium chlorides such as TiCl$_4$, dibutyl magnesium, a metal compound, or combinations of any two or more thereof. The presently preferred metal compound has the formula of $MR_{3-n}X_n$ in which the metal M is selected from the metals of Groups IIIA and IIIB of the Periodic Table of Elements; R is the same as that disclosed above; X is a halogen, preferably chlorine or bromine or combination thereof; and n is an integer of 0 to 3. An aluminum compound of the formula $AlR_{3-n}X_n$ is particularly preferred. An organoboron compounds of the formula $BR_{3-n}X_n$ can also be used. The currently preferred metal compounds include, but are not limited to, aluminum trichloride, triethylaluminum, ethylaluminum sesquichloride, ethylaluminum dichloride, diethylaluminum chloride, diethyl zinc, triethylboron, methylaluminum dibromide, ethylaluminum diiodide, isobutylaluminum dichloride, dodecylaluminum dibromide, dimethylaluminum bromide, diisopropylaluminum chloride, methyl-n-propylaluminum bromide, di-n-octylaluminum bromide, diphenylaluminum chloride, dicyclohexylaluminum bromide, dieicosylaluminum chloride, methylaluminum sesquibromide, ethylaluminum sesquiiodide, and combinations of any two or more thereof. The presently more preferred metal compound is selected from the group consisting of aluminum trichloride, ethylaluminum dichloride, ethylaluminum sequichloride, and combination thereof.

According to the present invention, the precipitating agent also comprises an ether. Any ether that is compatible with a Lewis acid to effect the precipitation of a solid catalyst intermediate having the desired physical characteristics from the solution prepared in the first step of the invention process can be used. Examples of suitable ethers include, but are not limited to, diethyl ether, di-n-propyl ether, di-n-butyl ether, diisobutyl ether, diisopropyl ether, diisoamyl ether, tetrahydrofuran, tetrahydropyran, dioxane, trioxane, crown ether, 2-methyl tetrahydrofuran, 2,5-dimethyl tetrahydrofuran, tetrahydropyran-2-methanol, tetrahydro-4H-pyran-4-ol, 2-methyl tetrahydropyran, 4-methyl tetrahydropyran, 3-methyl tetrahydropyran, and combinations of any two or more thereof. The presently more preferred ether is a cyclic saturated ether including, but not limited to, tetrahydrofuran, tetrahydropyran, dioxane, trioxane, crown ether, 2-methyl tetrahydrofuran, 2,5-dimethyl tetrahydrofuran, tetrahydropyran-2-methanol, tetrahydro-4H-pyran-4-ol, 2-methyl tetrahydropyran, 4-methyl tetrahydropyran, 3-methyl tetrahydropyran, and combinations of any two or more thereof. The presently most preferred ethers are tetrahydrofuran, tetrahydroyran, and combinations thereof.

The quantity of ether required can be any quantity that can substantially dissolve a Lewis acid for the precipitation of a solid which has the physical characteristics disclosed above and can later be treated with a transition metal compound to produce an olefin polymerization catalyst. The quantity can also be any quantity that can effect the precipitation of a solid that is near spherical in shape. Generally, the molar ratio of the ether to the Lewis acid can be in the range of from about 0.01:1 to about 10,000:1, preferably about 0.1:1 to about 1,000:1, more preferably about 0.1:1 to about 100:1, even more preferably about 0.5:1 to about 3:1, and most preferably about 1:1 to about 2:1. A mixture of the Lewis acid and the ether in desired molar ratio can then be prepared and employed in the process of the invention.

Any quantity of precipitating agent can be used so long as the quantity can effect the production of an olefin polymerization catalyst. Generally, the quantity of precipitating agent used is preferably sufficient to obtain optimum reaction between the resulting solid and the second transition metal compound in the next step. The optimum quantity of precipitating agent employed can be determined by routine experimentation. The molar ratio of the Lewis acid in the precipitating agent to the metal halide compound can be in the range of from about 0.01:1 to about 100:1, preferably about 0.1:1 to about 10:1, and most preferably 0.2:1 to 3:1. Obviously it is possible to use excess amounts of the precipitating agent since excess precipitating agent would be separated when the resulting solution is separated from the components in the solution following the reduction treatment.

The contacting of the precipitating agent with the solution can be carried out under any condition as long as the condition can effect the production of an olefin polymerization catalyst. Generally, it can be carried out at a temperature in the range of from about $-30°$ C. to about $200°$ C., preferably about $0°$ C. to about $175°$ C., and most preferably $10°$ C. to $150°$ C. Similar to combining the first transition metal compound and metal halide compound, the contacting of the solution with the precipitating agent can be carried out under any suitable pressure in the range of from about 0.5 to about 10 atmospheres. The length of time required can be determined by routine experimentation. Generally, the precipitating agent and the solution can be stirred together in a solvent for the precipitating agent for about 5 minutes to about 5 hours, preferably about 10 minutes to about 3 hours, and most preferably 15 minutes to 2 hours. Thereafter, the solid can be allowed to settle and the liquid can be decanted off or otherwise disposed of. It is generally preferred that the resulting solid be washed several times with a solvent for the precipitating agent. Most preferably the solid is washed until substantially all the components that are soluble in heptane at about $20°$ C. have been removed.

The resulting particulate solid is then contacted with a second transition metal compound wherein the second transition metal compound, in a suitable solvent such as, for example, a hydrocarbon or water if necessary, has the formula of $QX_q(OR)_{4-q}$, Q is a transition metal, X is a halogen, R is the same as that disclosed above, and q is an integer from 1 to 4. Some non-limiting examples of such compounds are titanium halides and vanadium halides such as, for example, titanium tetrachloride, titanium oxytrichloride, vanadium tetrachloride, vanadium oxytrichloride, and vanadium and titanium alkoxides wherein the hydrocarbyl radical of the alkoxide is a branched or unbranched alkyl radical having 1 to about 20 carbon atoms, more preferably 1 to about 6 carbon atoms. Also included are titanium and vanadium alkoxy halide compounds. Silicon halides such as $SiCl_4$, $HSiCl_3$, and $RSiCl_3$ can also be used. Halogenated tetravalent titanium compounds of the formula $TiX_q(OR)_{4-q}$ are particularly preferred, wherein X, q, and R are the same as that disclosed above. The transition metal compound can also be combinations of any two or more of the above-illustrated transition metal compounds. The currently preferred second transition metal compound is titanium tetrachloride. It is also within the scope of the present invention to employ complexes of such transition metal compounds with organic electron donors. The solvent or diluent can be the same as that disclosed in the first step of the process.

Any condition that can effect the production of an olefin polymerization catalyst can be used for contacting the solid with a second transition metal compound. Generally, the temperature employed for the contacting between the solid and the second transition metal compound is not critical. The contacting can be carried out at a temperature in the range of from about $-30°$ C. to about $200°$ C., preferably about $0°$ C. to about $150°$ C., most preferably $10°$ C. to $150°$ C. The condition can also include an optimum time for the contacting which can be determined by routine experimentation. Generally, it can be in the range of from about 5 minutes to about 4 hours, preferably about 10 minutes to about 3 hours, and most preferably 20 minutes to 2 hour. The amount of the second transition metal compound employed can be any amount so long as the amount can effect the production of an olefin polymerization catalyst. Generally such an amount can vary over a wide range and the optimum amount can be determined by routine experimentation. The molar ratio of the second transition metal compound to the metal halide compound can be in the range of from about 0.01:1 to about 100:1, preferably about 0.1:1 to about 50:1, and most preferably 1:1 to 20:1. The second transition metal compound and the solid are preferably stirred under the conditions disclosed above and then the solids are allowed to settle. The liquid can be decanted off and the catalyst can be washed several times with a solvent. Preferably the solid is washed to remove substantially all the components that are soluble in heptane at a temperature of about 20° C. The recovered solid catalyst can then be stirred in a dry or slurry form and is suitable for use in the polymerization of olefins.

If is preferred the solid catalyst be subjected to prepolymerization before use in actual preparation of polymer. Typically this involves contacting the catalyst with an α-olefin having about 2 to about 12 carbon atoms under prepolymerization conditions to form a prepolymerized catalyst component. Some non-limiting examples of olefins which can be used to form prepolymer include ethylene, propylene, butene-1, hexene-1, octene-1, decene-1, 4-methylpentene-1, and combinations of any two or more thereof. Although a cocatalyst is not always necessary, the prepolymerization is generally conducted in the presence of a cocatalyst. Process for the production of an olefin prepolymerization catalyst has been disclosed in, for example, U.S. Pat. Nos. 4,325,837 and 4,326,988, disclosure of which is incorporated herein by reference.

The prepolymerizing step can be performed by any method effective for prepolymerizing polymer onto the precipitate or the resulting catalyst. For example, the precipitating step can be entirely carried out under an olefin atmosphere; or the precipitating step can be carried out by adding a portion of the precipitating agent under a dry inert atmosphere followed by adding another portion of the precipitating agent under an olefin atmosphere; or other variations can be employed by one skilled in the art in accordance with the invention. Preferably, the prepolymerizing step is carried out after treatment of the precipitated intermediate with the second transition metal compound disclosed above. Prepolymerized catalysts prepared in this manner provide low fines content polymer when used in polymerization. Such prepolymerizations can require not only an adequate amount of cocatalyst which is disclosed hereinbelow, for example, triethylaluminum, but also a substantive time to allow prepolymerization to proceed. The amount of cocatalyst required can be readily determined according to the invention from the description and the examples set out below. The molar ratio of the cocatalyst as herein defined to the first transition metal compound is not particularly critical and can be selected over a relatively broad range. Generally, the molar ratio of the cocatalyst to the first transition metal compound is within a range of about 0.001:1 to about 1500:1. More preferably, the molar ratio is in the range of about 0.05:1 to about 20:1 so that the cocatalyst will be present in adequate amounts to initiate polymerization while allowing good control of the reaction.

The monomer which is utilized for prepolymerization can be the same as or different from the monomer used in polymerizations as set out herein.

The weight of prepolymer on the prepolymerized catalyst based on the total weight of the prepolymerized catalyst, as indicated above, is preferably from about 1 to about 80% by weight of the prepolymerized catalyst, more preferably from about 3% to about 50% by weight, and most preferably from about 5% to about 25% by weight of the prepolymerized catalyst.

The solid catalyst composition produced, whether prepolymerized or not, can be used in the polymerization of olefins. The catalyst composition can also be combined with a fumed silica such as, for example, Cab-O-Sil HS5 to aid in feeding of the catalyst composition to the reactor. The solid catalyst composition is generally used in combination with any organometallic cocatalysts known in the art as useful as cocatalyst for transition metal compounds. Generally, the cocatalyst can be selected from aluminum alkyls, alkylaluminum halides, and alkylaluminum hydrides in which the alkyl group each have 1 to about 8 carbon atoms. The currently preferred cocatalysts include, but are not limited to, triethylaluminum, triisobutylaluminum, diethylaluminum chloride, trihexylaluminum, and combinations of any two or more thereof. The molar ratio of a cocatalyst to the transition metal of the solid catalyst composition produced by the invention process can be any ratio which can effect the polymerization of an olefin. The ratio can vary over a wide range but generally can be in the range of from about 0.1:1 to about 1,000:1, preferably about 0.5:1 to about 200:1, and most preferably 1:1 to 100:1. For some applications, such as the polymerization of α-olefins having 3 or more carbons, it is sometimes desirable to include an electron donor in the catalyst system, either a separate component or as a complex with the cocatalyst. Examples of suitable electron donors can be an alkyltrialkoxysilane, a dialkyldialkoxysilane, a diaryldialkoxysilane, an alkylaryldialkoxysilane, an ester (such as ethylbenzoate, methyl-p-toluate), tetramethylpiperidine, or combinations of any two or more thereof.

The catalyst compositions of this invention can be used for the polymerization of ethylene, propylene, butylene, pentene, hexene, 4-methylpentene-1, higher alkenes, and combinations of any two or more thereof. The composition can also be used in the copolymerization of one or more of these olefins with polyunsaturated compounds such as, for example, butadiene. The composition is particularly suitable for the polymerization of ethylene, optionally together with an amount preferably not exceeding 20 mole percent of another olefin.

It is considered that the composition of the present invention can be employed in solution, gas phase, and slurry phase polymerizations; however, it is particularly suitable for slurry phase polymerizations. Slurry phase or particle form polymerization temperature and pressure conditions are generally selected to assure that polymer can be recovered as a slurry of discreet particles in the liquid diluent. Because olefin polymerization processes are well known to one skilled in the art, description of which is omitted herein for the interest of brevity.

The following examples are provided to assist one skilled in the art to further understand of the present invention and its various objects and advantages, and are not to be construed as unduly limiting the scope of the present invention.

The melt index (MI) and high load melt index (HLMI) of polymers were measured using ASTM-1238 conditions of 190/2.16 and 190/21.6 respectively. Bulk densities in lbs/ft$^3$ were measured by weighing a 100 ml graduated cylinder in which polymer fluff had been lightly tapped. Polymer fluff densities were determined according to ASTM-D-1505 using compression molded discs of polymer. The average particle size (APS) was determined by sieving.

EXAMPLE I

This example illustrates the preparation of a catalyst intermediate of an olefin polymerization catalyst. The procedure was carried out in a 250 ml half jacketed 3-neck flask, under a nitrogen atmosphere. Magnesium chloride, 2.04 g (21.5 mmoles), was suspended in 120 ml of heptane and 9.0 ml (42.9 mmoles) of titanium ethoxide was added to the flask to form a mixture. The mixture was heated to 95° C. in an oil bath and stirred for 1 hour. The flask was heated by passing oil through the jacket at the desired temperature. Unless otherwise noted, only the temperature of the oil is disclosed in this and the following examples. The temperature was lowered to 40° C. (oil bath) and 1.75 ml (21.6 mmoles) of tetrahydrofuran, THF, was added to 13.5 ml of 25 weight % ethylaluminum sesquichloride (EASC) (10.8 mmoles) in heptane in a dropping funnel connected to the flask. This solution was added over a 20 minute period to the flask. The resulting slurry was stirred for 1 hour and then filtered in a glove box. An off-white solid weighing 3.02 g was collected. Examination with a microscope showed the presence of globular particles of about 50 microns in diameter. Some larger spheres were also observed along with sphere fragments suggesting that some spheres might be hollow.

EXAMPLES II–VI

Following the procedure in Example I, a series of catalyst intermediates was prepared using different addition temperatures for the EASC/THF mixture. Results are shown in Tables I and II.

EXAMPLE VII

This example shows the preparation of a catalyst intermediate by precipitation using near stoichiometric THF and ethylaluminum dichloride. The procedure of Example II (see Table I) was repeated using 14.0 ml of 25 weight % ethylaluminum dichloride (EADC) in place of EASC. The yield of off-white solid was 3.00 g. Most particles were near spherical and about 80 microns in diameter.

EXAMPLE VIII

This is a comparative example showing that the procedure in Example IV (Table I) produced some of the best looking particles, most of them close to spherical and about 40 microns in diameter. Therefore, this procedure was repeated using no THF. The off-white product thus-obtained weighed 2.69 g. Much of the product was <10 microns in diameter, except for large agglomerates which appeared to be formed from the smaller particles.

EXAMPLE IX

This is also a comparative example showing that an ether and a Lewis acid must be present in order to prepare a solid catalyst intermediate.

In a variation of Example V (Table I), the THF was added separately and followed by the EASC solution. No solid formed until the EASC was added. The very fine yellow product weighed 4.05 g. The solid settled slower and was harder to dry than Example V. Most particles appeared to be agglomerates of particles as small as 3 microns.

TABLE I

| | | Particle Observations | | |
|---|---|---|---|---|
| Example | Temp. (°C.) | Yield (g) | Color | Comments |
| II | 40 | 3.02 | off-white | globules, 50 microns |
| III | 95 | 5.43 | brown | granules, 70–140 microns |
| IV | 50 | 2.55 | off-white | near spherical, 25–60 microns |
| V | 70 | 3.42 | yellow | granules, 15–80 microns |
| VI | 35 | 3.58 | off-white | large spheres, 100 microns and small spheres, 35 microns |
| VII | 40 | 3.00 | off-white | near spherical, ~80 microns |
| Comp. VIII | 50 | 2.69 | off-white | irregular, <5 microns and large agglomerates |
| Comp. IX | 70 | 4.05 | yellow | irregular, ~3 microns and large agglomerates |

These Examples (II–IX) show that the combination of a small amount of THF and a Lewis acid modified the precipitation process to produce larger particles with more desirable shape than those produced without THF.

EXAMPLE X

This example illustrates the use of a mole ratio of THF to EASC at about 3:1 or a ratio of THF/Al at about 3:2 for the precipitation of catalyst intermediate.

The procedure of Example V (Table I) was repeated using 33.3 mmoles of THF as modifier. The yield was 2.97 g of yellow-orange free flowing powder consisting of rough particles ranging from about 25 to about 80 microns.

EXAMPLE XI

This example illustrates the use of a mole ratio of THF to EASC at about 1:1 for the precipitation of catalyst intermediate.

The procedure of Example IV (Table I) was repeated using 11.1 mmoles of THF as modifier. The yield was 1.93 g of off-white solid. The product was more difficult to dry than Example IV and tended to cake. The solid contained few spheres and ranged from about 3 to about 100 microns.

EXAMPLE XII

The procedure of Example IV was repeated using 33.3 mmoles of THF as modifier. The yield was 2.71 g of off-white solid. Using a microscope, three types of particles could be seen, white spheres of 50–100 microns in diameter, nearly spherical particles of about 30 microns in diameter, and amber spheres about 10 microns in diameter.

These Examples (X–XII) show that the amount of THF used in the preparation of the catalyst intermediate affected the type and size of particle produced.

Table II summarizes some analytical results for catalyst intermediates obtained in some of the foregoing examples. Each sample (0.2 gram) was dissolved in 50 ml of 10% (V/V) sulfuric acid. The solution was diluted to 100 ml with distilled water and weighed. Titanium, magnesium, and aluminum were obtained by inductively coupled plasma emission (ICP) analysis while chloride was determined by ion chromatography or by titration with silver nitrate on aqueous solutions containing the catalyst intermediates.

TABLE II

Analysis of Intermediates

| Sample Number | % Ti | % Mg | % Al | % Cl |
|---|---|---|---|---|
| III | 10.76 | 4.79 | 2.87 | 14.48 |
| IV | 7.55 | 9.07 | 0.92 | 22.93 |
| X | 8.02 | 8.08 | 1.67 | 24.11 |
| VI | 7.24 | 8.80 | 0.86 | 23.72 |
| VII | 6.16 | 8.62 | 1.76 | 25.34 |
| Comp. VIII | 9.69 | 9.59 | 3.26 | 28.48 |

EXAMPLES XIII–XXII

These examples illustrate catalyst preparation by treatment of the catalyst intermediates with titanium (IV) chloride as the second transition metal compound. These examples also show the use of these catalysts for polymerization of ethylene.

Some of the catalyst intermediates prepared in the above examples were converted to olefin polymerization catalysts by treatment with titanium tetrachloride using two separate procedures. In procedure A, 1.00 g of the material was suspended in 5 ml of heptane and 10 ml of TiCl$_4$ was added. Each slurry was heated to 100° C. for 1 hour and then filtered, each of the resulting solids was thoroughly washed with heptane till no visible soluble material was observed, and dried.

In procedure B, 1.00 g was suspended in 30 ml of heptane and 2.0 ml of TiCl$_4$ was added. The slurries were stirred at room temperature for 1 hour and then isolated as in procedure A.

TABLE III

Catalyst Identification and Partial Analytical Results

| Example | Source[a] | Procedure | % Ti | % Mg | % Al | % Cl |
|---|---|---|---|---|---|---|
| XIII | VI | A | | | | |
| XIV | VII | A | 10.36 | 9.85 | 0.99 | 56.11 |
| XV | V | A | | | | |
| XVI | IV | A | | | | |
| XVII | III | A | 18.73 | 7.28 | 0.71 | 63.91 |
| XVIII | VI | B | | | | |
| XIX | VII | B | 11.82 | 7.01 | 0.94 | 55.08 |
| XX | V | B | | | | |
| XXI | IV | B | | | | |
| XXII | III | B | 17.28 | 5.81 | 1.28 | 53.82 |

[a]The sources shown are example numbers.

Polymerization

All polymerizations were carried out in a 1 gallon Autoclave Engineers reactor. The reactor was prepared for use by purging with nitrogen and heating the empty reactor to 120° C. After cooling to below 40° C. and purging with isobutane vapors, 1 ml of 15 weight % TEA (triethylaluminum) in heptane, about 10 mg of catalyst or a slurry of the catalyst, and 2 liters of isobutane were added. The slurry was stirred at 700 rpm and heated to close to the polymerization temperature, 90° C. While heating, hydrogen was added from an auxiliary vessel of 325 cc and measured by the pressure drop, most often 350 psig. Ethylene was then added and fed on demand to maintain the total pressure at 410 psig.

TABLE IV

Ethylene Polymerization Activity

| Catalyst No. | Source[a] | Procedure | Activity (g/g/hr) | Melt Index | HLMI/MI |
|---|---|---|---|---|---|
| XIII | VI | A | 58,850 | 2.1 | 32.4 |
| XIV | VII | A | 33,230 | 0.97 | 34.0 |
| XV | V | A | 18,510 | 1.1 | 30.9 |
| XVI | IV | A | 24,740 | 1.7 | 32.4 |
| XVII | III | A | 24,280 | 0.58 | 36.2 |
| XVIII | VI | B | 29,760 | 2.7 | 30.0 |
| XIX | VII | B | 27,140 | 2.5 | 28.8 |
| XX | V | B | 34,450 | 2.0 | 30.0 |
| XXI | IV | B | 34,440 | 2.0 | 32.0 |
| XXII | III | B | 41,410 | 1.3 | 30.0 |

[a]See Table II footnote a.

These results show that the catalysts prepared by the invention process were highly active for ethylene polymerization.

EXAMPLE XXIII

This example shows the use of tetrahydropyran (THP) as ether to prepare a catalyst intermediate.

In a 1 liter 3-neck flask, magnesium chloride, 10.20 g (107 mmoles), was suspended in 500 ml of heptane and 50.0 ml (238 mmoles) of titanium (IV) ethoxide was added. The slurry was heated to 96° C., as measured by an internal thermocouple, for 1 hour. A mixture of 11.5 ml of THP (118 mmoles) and 75.0 ml of 25% EASC (60 mmoles for a THP/Al ratio of 0.98) was prepared and allowed to separate into two phases. This separation took about 15 minutes. After cooling, the reaction slurry to 50° C., the EASC/THP mixture was added over 22 minutes while stirring the 1 liter flask vigorously with a flat bladed stirrer. Solid formation was not evident until about ¾ of the way through the addition. The 19.48 g of very light brown solid was isolated. This solid consisted mostly of near-spherical particles of about 25–30 microns in diameter, as estimated from photographs.

EXAMPLES XXIV–XXVIII

These examples further illustrate catalyst preparation from catalyst intermediates using titanium (IV) chloride.

The preparation was carried out by heating the mixture shown in Table V for one hour at either 25° C. or 100° C.

TABLE V

Control of THP Catalyst Activation

| Catalyst No. | Source[a] | Weight (g) | Heptane (ml) | TiCl$_4$ (ml) | Temp. (°C.) |
|---|---|---|---|---|---|
| XXIV | XXIII | 2.00 | 14.0 | 1.0 | 25 |
| XXV | XXIII | 2.00 | 10.0 | 5.0 | 25 |
| XXVI | XXIII | 2.00 | 5.0 | 10.0 | 25 |
| Comp. XXVII | Comp. VIII | 1.00 | 5.0 | 10.0 | 25 |
| Comp. XXVIII | Comp. VIII | 1.00 | 5.0 | 10.0 | 100 |

[a]See Table III footnote a.

The catalysts prepared in Table V were then used for ethylene polymerizations which were carried out as in Examples XIII–XXII. Results are shown in Table VI.

TABLE VI

Catalyst with THP Compared to Control

| Run Number[a] | THP/Al | Activity (g/g/hr) | Melt Index | HLMI/MI |
|---|---|---|---|---|
| XXIV | 1.0 | 36,110 | 3.5 | 29.1 |
| XXV | 1.0 | 49,140 | 1.8 | 34.4 |
| XXVI | 1.0 | 44,960 | 1.9 | ND[b] |
| Comp. XXVII | 0.0 | 60,450 | 2.8 | 33.2 |
| Comp. XXVIII | 0.0 | 67,000 | 1.0 | 31.0 |

[a]See catalyst no. in Table V.
[b]ND, not determined.

These Examples, XXIII–XXVIII, show that tetrahydropyran can also be used to prepare catalysts with improved size and high activity.

The following Examples XXIX to XXXV illustrate the preparation of catalyst intermediates using a THF/Al ratio of 3 or higher. Example XXIX illustrates the general procedure.

EXAMPLE XXIX

This example shows THF/Al mole ratio of 3.

After heating 2.04 g (21.5 mmoles) of $MgCl_2$ and 9.0 ml (42.9 mmoles) of titanium tetraethoxide in 120 ml of heptane in a 250 ml half-jacketed flask with 100° C. oil for 1 hour, a nearly clear solution was obtained. Meanwhile 14.0 ml (21.4 mmoles) of 25 weight % EADC and 5.2 ml (64.1 mmoles) of THF were mixed in a dropping funnel. After cooling the oil to 60° C., the EADC/THF mixture was added. Solid formation was pronounced near the end of the addition. The white solid was examined with a microscope. There were no spheres, only irregular particles of 10–30 microns in diameter.

EXAMPLE XXX

This example shows a THF/Al ratio of 5.

The procedure shown in Example XXIX was repeated using 8.7 ml (107 mmoles) of THF for a THF/Al ratio of 5. A small sample of the slurry was evaporated on a slide for examination using a microscope. Globular particles of about 10–30 microns were observed.

EXAMPLE XXXI

This example shows a THF/Al ratio of 20.

The procedure of Example XXIX was repeated again using 35.0 ml (431 mmoles) of THF for a THF/Al ratio of 20. Particles were not as regular as above, but appeared larger.

EXAMPLE XXXII

This example shows a THF/Al ratio of 1 in a precipitating agent.

The procedure of Example XXIX was repeated again using 1.80 ml of THF for a THF/Al ratio of 1.

EXAMPLE XXXIII

This is a comparative, or control, example using no THF in a precipitating agent.

The control was produced using no THF and the solid was isolated therefrom.

EXAMPLES XXXIV AND XXXV

These examples illustrate that catalysts prepared from the catalyst intermediates have substantially the same particle size distribution as the intermediates from which the catalyst produced.

To two of the slurries prepared using THF Examples XXXI and XXXII, after removing small samples for particle size analysis, 30 ml of $TiCl_4$ was added followed by stirring for 1 hour. The solids were isolated by decantation and washed with about 60 ml of heptane three times and reslurried in heptane to produce the corresponding slurries XXXIV from XXXII and XXXV from XXXI.

Particle size distributions were measured with the Microtrac laser light scattering instrument which is well known to one skilled in the art. The results are shown below in Table VII. Average particle size is shown as d(10%), d(50%) and (90%), which are the volume % of a catalyst or catalyst intermediate smaller than the sizes given in microns shown in Table VII. The geometric standard deviation, shown as sd, is a measure of the breadth of the particle size distribution.

TABLE VII

Particle Size Distribution

| Source[a] | THF/Al | d (10%) | d (50%) | d (90%) | sd |
|---|---|---|---|---|---|
| XXXIII | 0 | 5.2 | 10.8 | 18.6 | 4.8 |
| XXXII | 1 | 3.2 | 15.7 | 91.9 | 23.7 |
| XXXIV[b] | 1 | 2.7 | 18.9 | 93.8 | 24.7 |
| XXX | 5 | 9.5 | 20.5 | 53.2 | 15.0 |
| XXXI | 20 | 15.2 | 28.7 | 45.3 | 11.1 |
| XXXV[b] | 20 | 14.7 | 30.9 | 51.3 | 13.2 |

[a]See footnote in Table III.
[b]Sources XXXIV and XXXV were catalysts. See text for detail.

The above Examples, XXIX–XXXV, demonstrate the changes that occured as THF was introduced in the catalyst preparation. At first the particle size distribution was broadened, and then narrowed. All the while the average particle size increased.

The examples also show that there was little or no change in the particle size distribution as a catalyst intermediate was converted to a catalyst. Thus, the formation of the particles in the precipitation step is the key to control of the catalyst particle size and ultimately the particle distribution of the olefin polymers produced with the catalyst.

EXAMPLE XXXVI

This example is a comparative example showing that if THF is used in the first step of the invention process, no solid catalyst intermediate is formed.

Magnesium chloride, 2.04 g, was suspended in 120 ml of THF and 9.0 ml of titanium tetraethoxide was added. The slurry could only be heated to 65° C. because of the low boiling point of THF. However, the solid quickly dissolved. After cooling to 60° C., a solution of 14.0 ml of 25 weight % EADC and 35 ml of THF was added from a dropping funnel. No solid formed. Cooling to 20° C. produced no solid, but a brown color was observed indicating possible reduction of titanium.

As the amount of THF is increased, the limiting case of pure THF is approached. This limiting example shows that large amounts of THF prevent precipitation of the catalyst intermediate.

This example shows that a cyclic ether such as THF cannot be used in the first step of the process for preparing a solution.

EXAMPLES XXXVII–LVII

These examples demonstrate that prepolymerization using a catalyst and deposition of the resulting prepolymer on the catalyst improve the catalyst activity.

In a 1 liter reactor, 10.2 g (107 mmoles) of magnesium chloride was suspended in 500 ml of heptane and 83 ml (243 mmoles) of titanium (IV) butoxide was added. The slurry was heated to 95° C. as measured by an internal thermocouple. After stirring for 2 hours, the temperature was reduced to 45° C. Meanwhile, 10 ml (123 mmoles) of THF was mixed with 77.5 ml (118 mmoles) of EADC with cooling to prepare a EADC/THF mixture. The EADC/THF mixture was added to the reactor and the temperature was lowered to 25° C. The solid was washed 4 times each with 350 ml of heptane and then diluted to 350 ml with heptane. Titanium (IV) chloride, 150 ml (1368 mmoles), was added followed by stirring for 1 hour. The solid was separated by decanting and washed twice each with 350 ml of heptane.

The yellow solid was reslurried in heptane to 500 ml and heated to 50° C. Next, 5 ml of 1M TEA was added and the reactor was pressured to 40 psig with ethylene and allowed to fall as consumed. Prepolymerization was carried out at 50° C. for 2 hours, 60° C. for 2 hours, and 70° C. for 40 minutes. The slurry was cooled to 25° and the solid was separated by decanting and washed twice with heptane.

The procedure was repeated using titanium tetraethoxide as shown in Table VIII.

Similar preparations were conducted with 428 mmoles of magnesium chloride in a 4 liter reactor. Volumes were increased by a factor of about 4. In most prepolymerizations the temperature was constant while the pressure was held at 40 psig. Table VIII below summarizes the prepolymerization conditions.

TABLE VIII

Summary of Prepolymerizations

| Example | R in Ti(OR)$_4$ | Ti(OR)$_4$ (mmole) | EADC (mmole) | THF (mmole) | Precip. (°C.) | TEA (ml) | Prepol. (°C.) | Time (min) | Pressure |
|---------|-----------------|---------------------|--------------|-------------|---------------|----------|---------------|------------|----------|
| XXXVII | butyl | 243 | 118 | 123 | 45 | 5 | 50–70 | 280 | drop |
| XXXVIII | ethyl | 215 | 96 | 96 | 55 | 5 | 70 | 300 | held |
| XXXIX | ethyl | 215 | 96 | 96 | 55 | 10 | 0 | 60 | held |
| XL | ethyl | 858 | 386 | 385 | 55 | 40 | 0 | 120 | held |
| XLI | ethyl | 858 | 386 | 385 | 55 | 10 | 0 | 120 | held |
| XLII | ethyl | 954 | 422 | 421 | 55 | 10 | 0 | 120 | held |
| XLIII | ethyl | 858 | 428 | 429 | 55 | 40 | 0 | 60 | held |

Samples of catalysts shown in Table VIII were taken before and after the prepolymerization and tested for ethylene polymerization activity. The ethylene polymerization procedure was the same as that disclosed above in Examples XIII–XXII. Results are shown in Table IX.

TABLE IX

Increased Activity by Prepolymerization

| Catalyst Prep. | Prepoly. Stage | Source[a] | Ti (ppm) | Cl (ppm) |
|----------------|----------------|-----------|----------|----------|
| XLIV | before | XXXVII | 25 | 90 |
| XLV | after | XXXVII | 4.6 | 15 |
| XLVI | before | XXXVIII | 11 | 40 |
| XLVII | after | XXXVIII | 5.9 | 25 |
| XLVIII | before | XXXIX | 11 | 40 |
| XLIX | after | XXXIX | 3.8 | 15 |
| L | before | XL | 11 | 35 |
| LI | after | XL | 10 | 45 |
| LII | before | XLI | 9.7 | 35 |
| LIII | after | XLI | 4.0 | 15 |
| LIV | before | XLII | 13 | 55 |
| LV | before | XLII | 10 | 45 |

TABLE IX-continued

Increased Activity by Prepolymerization

| Catalyst Prep. | Prepoly. Stage | Source[a] | Ti (ppm) | Cl (ppm) |
|----------------|----------------|-----------|----------|----------|
| LVI | before | XLIII | 19 | 60 |
| LVII | after | XLIII | 6.4 | 25 |

[a]See Table III, footnote a.

These results show that the prepolymerization step which deposited a prepolymer onto a catalyst generally increased the activity of the catalysts. The activity in Table IX was based on the titanium and chloride residues in the polymers. The lower these residues were, the higher the activities of these catalysts were.

EXAMPLE LVIII

This example illustrates that an olefin polymerization catalyst prepared by the invention process for a large scale polymerization process.

In a 5 liter flask fitted with a mechanical stirrer with a Teflon® paddle, 40.0 g (420 mmoles) of MgCl$_2$ was slurried in 2 liter of heptane and 180 ml (859 mmoles) of titanium (IV) ethoxide was added. The slurry was heated to 94°–96° C. (internal thermocouple) for 1 hour yielding a solution with a gray tinge. While cooling, 35 ml (431 mmoles) of THF was added to 280 ml (428 mmoles) of 25 weight % EADC. Two layers were formed and the top layer was decanted off and destroyed. Over a 6 minute period the bottom layer was added to the solution above, which had been cooled to 53°–55° C. (internal measurement) while stirring vigorously. The heating mantle was removed, the temperature allowed to fall and the stirring rate was reduced. Air was blown across the flask to assist in cooling. It took about 45 minutes to reach 30° C. The stirring was stopped and the solid settled in less than 5 minutes. The liquid was decanted off and the solid was washed 3 times each with 400 ml of heptane. The solid was reslurried in about 1200 ml of heptane. Next, 600 ml of TiCl$_4$ was added and the slurry turned slightly green. After stirring for 1 hour, the liquid was decanted off and the solid was washed 4 times each with 400 ml of heptane.

The slurry was transferred to a 4 liter reactor and diluted to 2 liters with heptane. After adding 40 ml of 15 weight % TEA (40 mmoles), the reactor was cooled to 0° C. and then pressured to 40 psig with ethylene and held there for 1 hour. Finally the solid catalyst was washed twice each with 800 ml of heptane.

The process above was repeated three times using 40.8 g of MgCl$_2$ and 185 ml of titanium tetraethoxide.

Catalyst samples thus-obtained were labeled and then combined as Example LVIII catalyst.

EXAMPLES LIX–LXVII

These examples illustrate the use of the catalysts prepared by the invention process for olefin polymerization and the polymers produced therefrom.

Catalyst LVIII was tested in a 23-gallon slurry loop reactor with continuous product take-off. A high activity catalyst prepared according to U.S. Pat. No. 4,326,988 was used for comparison. Conditions are shown in Table X.

TABLE X

| Run | Reactor TEMP, F. | Flash Gas Ethylene mole % | $H_2/C_2 =$ mole ratio | $C_6/C_2 =$ mole ratio |
|---|---|---|---|---|
| Comp. LIX[a] | 214.0 | 6.01 | 0.241 | 0.035 |
| Comp. LX[a] | 214.0 | 5.80 | 0.238 | 0.025 |
| Comp. LXI[a] | 214.1 | 5.88 | 0.212 | 0.022 |
| LXII[b] | 214.3 | 6.12 | 0.196 | 0.022 |
| LXIII[b] | 214.4 | 5.86 | 0.205 | 0.023 |
| Comp. LXIV[a] | 212.0 | 7.71 | 0.070 | 0.064 |
| Comp. LXV[a] | 212.1 | 7.70 | 0.070 | 0.083 |
| LXVI[b] | 212.1 | 8.04 | 0.068 | 0.085 |
| LXVII[b] | 211.8 | 7.64 | 0.057 | 0.086 |

[a]These runs used a catalyst prepared by the process disclosed in U.S. Pat. No. 4,326,988.
[b]These runs employed the invention catalyst LVIII disclosed in Example LVIII.

The ethylene homopolymers and ethylene/hexene-1 copolymers prepared as described in Table X were analyzed for their physical properties and the results are shown in Table XI.

TABLE XI

| | | | | | Characteristics of Resins Produced | | | | | | | |
|---|---|---|---|---|---|---|---|---|---|---|---|---|
| | | Fluff | Bulks | Ash | Xylenes | Screen Analysis | | | | | | |
| Run | MI | Density g/cc | Density lb/cu. ft. | Ti/Cl ppm | Soluble wt % | 10 mesh | 20 mesh | 35 mesh | 60 mesh | 100 mesh | 200 mesh | Pan | APS |
| Comp. LIX | 92 | .9700+ | 22.0 | 3.6/15 | | 0.03 | 0.01 | 0.03 | 6.67 | 37.54 | 35.6 | 20.12 | 149 |
| Comp. LX | 119 | .9700+ | 22.6 | 3.9/15 | | 0.00 | 0.00 | 0.15 | 4.56 | 36.93 | 0.08 | 58.28 | 114 |
| Comp. LXI | 99 | .9700+ | 22.4 | 4.3/15 | | 0.01 | 0.02 | 0.1 | 10.1 | 32.26 | 35.58 | 21.94 | 152 |
| LXII | 101 | .9700+ | 29.6 | 4.1/20 | 0.48 | 0.00 | 0.11 | 0.17 | 27.83 | 33.99 | 21.09 | 16.81 | 205 |
| LXIII | 101 | .9700+ | 29.0 | 4.4/20 | 0.92 | 0.02 | 0.69 | 10.4 | 37.03 | 20.98 | 17.51 | 13.37 | 286 |
| Comp. LXIV | 6.0 | 0.9631 | 19.4 | 2.4/10 | 0.6 | | | | | | | | |
| Comp. LXV | 4.8 | 0.9620 | 19.6 | 2.6/10 | 0.72 | 0.01 | 0.00 | 0.17 | 26.8 | 49.67 | 12.94 | 10.41 | 220 |
| LXVI | 6.3 | 0.9613 | 27.0 | 2.6/10 | 0.36 | 0.02 | 0.24 | 6.53 | 39.18 | 21.08 | 16.7 | 16.25 | 262 |
| LXVII | 5.7 | 0.9610 | 27.4 | 2.3/10 | 0.28 | 0.01 | 1.82 | 13.45 | 38.19 | 17.14 | 18.08 | 11.32 | 319 |

The results in Table XI show that, based on the ash (titanium and chlorine residues) content of the polymers produced by the invention catalyst (LVIII) in runs LXII, LXIII, LXVI and LXVII and that of the polymers produced by the comparative catalyst in runs LX, LXI, LXIV and LXV, the invention catalyst had comparable activity as the comparative catalyst. However, the polymers produced by the invention catalyst had significantly higher bulk densities and larger average particle size (APS) than the polymers produced by the comparative catalyst.

The results shown in the above examples also clearly demonstrate that the present invention is well adapted to carry out the objects and attain the ends and advantages mentioned as well as those inherent therein. While modifications may be made by those skilled in the art, such modifications are encompassed within the spirit of the present invention as defined by the specification and the claims.

That which is claimed:

1. A process comprising: (1) combining a first transition metal compound and a metal halide, in a solvent, to form a solution; (2) contacting said solution with a precipitating agent to form a solid catalyst intermediate wherein said precipitating agent comprises a sufficient amount of both a Lewis acid and an ether to effect the precipitation of said catalyst intermediate; and (3) contacting said solid catalyst intermediate with a second transition metal compound to produce a catalyst composition.

2. A process according to claim 1 wherein the metal of said first transition metal compound is selected from the group consisting of titanium, zirconium, vanadium, and combinations of any two or more thereof.

3. A process according to claim 1 wherein said first transition metal compound is selected from the group consisting of titanium tetrahydrocarbyloxide, titanium tetraamides, titanium tetramercaptides, zirconium tetrahydrocarbyloxides, zirconium tetraamides, zirconium tetramercaptides, vanadium tetrahydrocarbyloxides, vanadium tetraamides, vanadium tetramercaptides, and combinations of any two or more thereof.

4. A process according to claim 3 wherein said titanium tetrahydrocarbyloxide has the formula of $Ti(OR)_4$ wherein each R is a hydrocarbyl radical and is independently selected from the group consisting of alkyl radicals, aryl radicals, alkenyl radicals, alkaryl radicals, aralkyl radicals, and combinations of any two or more thereof.

5. A process according to claim 4 wherein said titanium tetrahydrocarbyloxide is selected from the group consisting of titanium tetramethoxide, titanium tetraethoxide, titanium tetra-n-butoxide, titanium tetrahexyloxide, titanium tetradecyloxide, titanium tetraeicosyloxide, titanium tetracyclohexyloxide, titanium tetrabenzyloxide, titanium tetra-p-tolyloxide, titanium tetraphenoxide, and combinations of any two or more thereof.

6. A process according to claim 4 wherein said titanium tetrahydrocarbyloxide is titanium tetraethoxide.

7. A process according to claim 1 wherein the metal of said metal halide is selected from the group consisting of beryllium, magnesium, calcium, manganese, scandium, yttrium, the lanthanides, and combinations of any two or more thereof.

8. A process according to claim 1 wherein said metal halide is selected from the group consisting of beryllium dichloride, beryllium dibromide, beryllium hydroxyiodide, magnesium dichloride, magnesium dibromide, magnesium hydroxychloride, magnesium diiodide, calcium dichloride, calcium dibromide, calcium hydroxybromide, manganese dichloride, manganese dibromide, manganese diiodide, manganese hydroxychloride, and combinations of any two or more thereof.

9. A process according to claim 1 wherein said metal halide is magnesium dichloride.

10. A process according to claim 1 wherein said Lewis acid is selected from the group consisting of boron trichloride, titanium chlorides, a compound having the formula of $MR_{3-n}X_n$, and combinations of any two or more thereof wherein M is selected from the group consisting of the elements of Groups IIIA and IIIB of the Periodic Table of Elements and combinations of any two or more thereof, each R is a hydrocarbyl radical and is independently selected from the group consisting of alkyl radicals, aryl radicals, alkenyl radicals, alkaryl radicals, aralkyl radicals, and combinations of any two or more thereof, X is a halogen and combinations of any two or more thereof, and n is an integer of 0 to 3.

11. A process according to claim 10 wherein M is selected from the group consisting of aluminum, boron, and combination thereof.

12. A process according to claim 1 wherein said Lewis acid has the formula of $AlR_{3-n}X_n$, wherein each R is independently selected from the group consisting of alkyl radicals, aryl radicals, alkenyl radicals, alkaryl radicals, aralkyl radicals, and combinations of any two or more thereof, X is a halogen, and n is an integer of 0 to 3.

13. A process according to claim 1 wherein said Lewis acid is selected from the group consisting of aluminum trichloride, triethylaluminum, ethylaluminum sesquichloride, ethylaluminum dichloride, diethylaluminum chloride, diethyl zinc, triethylboron, methylaluminum dibromide, ethylaluminum diiodide, isobutylaluminum dichloride, dodecylaluminum dibromide, dimethylaluminum bromide, diisopropylaluminum chloride, methyl-n-propylaluminum bromide, di-n-octylaluminum bromide, diphenylaluminum chloride, dicyclohexylaluminum bromide, dieicosylaluminum chloride, methylaluminum sesquibromide, ethylaluminum sesquiiodide, and combinations of any two or more thereof.

14. A process according to claim 1 wherein said Lewis acid is selected from the group consisting of aluminum trichloride, ethylaluminum dichloride, ethylaluminum sesquichloride, and combinations of any two or more thereof.

15. A process according to claim 1 wherein said ether is selected from the group consisting of diethyl ether, di-n-propyl ether, di-n-butyl ether, diisobutyl ether, diisopropyl ether, diisoamyl ether, tetrahydrofuran, tetrahydropyran, dioxane, trioxane, 2-methyl tetrahydrofuran, 2,5-dimethyl tetrahydrofuran, tetrahydropyran-2-methanol, tetrahydro-4H-pyran-4-ol, 2-methyl tetrahydropyran, 4-methyl tetrahydropyran, 3-methyl tetrahydropyran, and combinations of any two or more thereof.

16. A process according to claim 1 wherein said ether is selected from the group consisting of tetrahydrofuran, tetrahydropyran, dioxane, trioxane, 2-methyl tetrahydrofuran, 2,5-dimethyl tetrahydrofuran, tetrahydropyran-2-methanol, tetrahydro-4H-pyran-4-ol, 2-methyl tetrahydropyran, 4-methyl tetrahydropyran, 3-methyl tetrahydropyran, and combinations of any two or more thereof.

17. A process according to claim 1 wherein said ether is selected from the group consisting of tetrahydrofuran, tetrahydropyran, and combination thereof.

18. A process according to claim 1 wherein said second transition metal compound is selected from the group consisting of titanium halides, vanadium halides, titanium hydrocarbyloxytrichlorides, vanadium oxytrichlorides, titanium alkoxides, vanadium alkoxides, and combinations of any two or more thereof.

19. A process according to claim 1 wherein said second transition metal compound has the formula of $TiX_q(OR)_{4-q}$ wherein X is a halogen; each R is independently selected from the group consisting of alkyl radicals, aryl radicals, alkenyl radicals, alkaryl radicals, aralkyl radicals, and combinations of any two or more thereof; and q is an integer in the range of 1 to 4.

20. A process according to claim 1 wherein said second transition metal compound is titanium tetrachloride.

21. A process according to claim 1 wherein step (1) of said process is carried out at a temperature in the range of from about 15° C. to about 200° C.

22. A process according to claim 1 wherein step (1) of said process is carried out at a temperature in the range of from 30° C. to 120° C.

23. A process according to claim 1 wherein steps (2) and (3) of said process are each carried out at a temperature in the range of from about –30° C. to about 200° C.

24. A process according to claim 1 wherein steps (2) and (3) of said process are each carried out at a temperature in the range of from 10° C. to 150° C.

25. A process according to claim 17 wherein said process further comprising prepolymerizing said catalyst composition with an α-olefin to prepare a prepolymerized catalyst composition wherein the polymer deposited during said prepolymerization is in an amount in the range of from about 1 to about 80 weight % of the prepolymerized catalyst composition.

26. A process according to claim 1 wherein the molar ratio of said first transition metal compound to said metal halide is in the range of from about 0.01:1 to about 100:1.

27. A process according to claim 1 wherein the molar ratio of said first transition metal compound to said metal halide is in the range of from 0.5:1 to 3:1.

28. A process according to claim 1 wherein the molar ratio of said ether to said Lewis acid is in the range of from about 0.1:1 to about 100:1.

29. A process according to claim 1 wherein the molar ratio of said ether to said Lewis acid is in the range of from about 1:1 to about 2:1.

30. A process according to claim 1 wherein the molar ratio of said Lewis acid to said metal halide is in the range of from about 0.01:1 to about 100:1.

31. A process according to claim 1 wherein the molar ratio of said Lewis acid to said metal halide is in the range of from 0.2:1 to 3:1.

32. A process according to claim 1 wherein the molar ratio of said second transition metal compound to said metal halide is in the range of from about 0.01:1 to about 100:1.

33. A process according to claim 1 wherein the molar ratio of said second transition metal compound to said metal halide is in the range of from 1:1 to 20:1.

34. A process according to claim 1 wherein said process further comprising prepolymerizing said catalyst composition with an α-olefin to prepare a prepolymerized catalyst composition wherein the polymer deposited during said prepolymerization is present in an amount in the range of from about 1 to about 80 weight % of said prepolymerized catalyst composition.

35. A process comprising: (1) combining, in a solvent, a first transition metal compound and a metal halide to form a solution; (2) contacting said solution with a precipitating agent to form a solid catalyst intermediate; and (3) contacting said solid catalyst intermediate with a second transition metal compound to produce a catalyst composition, wherein said precipitating agent comprises a Lewis acid and an ether;

said first transition metal compound is a titanium tetrahydrocarbyloxide having the formula of Ti(OR)$_4$ wherein each R is a hydrocarbyl radical and is independently selected from alkyl radicals, aryl radicals, alkenyl radicals, alkaryl radicals, aralkyl radicals, and combinations of any two or more thereof;

said metal halide is selected from the group consisting of beryllium dichloride, beryllium dibromide, beryllium hydroxyiodide, magnesium dichloride, magnesium dibromide, magnesium hydroxychloride, magnesium diiodide, calcium dichloride, calcium dibromide, calcium hydroxybromide, manganese dichloride, manganese dibromide, manganese diiodide, manganese hydroxychloride, and combinations of any two or more thereof;

said Lewis acid has the formula selected from the group consisting of AlR$_{3-n}$X$_n$, BR$_{3-n}$X$_n$, and combinations thereof wherein each R is independently selected from the group consisting of alkyl radicals, aryl radicals, alkenyl radicals, alkaryl radicals, aralkyl radicals, and combinations of any two or more thereof, X is a halogen, and n is an integer of 0 to 3;

said ether is selected from the group consisting of tetrahydrofuran, tetrahydropyran, dioxane, trioxane, 2-methyl tetrahydrofuran, 2,5-dimethyl tetrahydrofuran, tetrahydropyran-2-methanol, tetrahydro-4H-pyran-4-ol, 2-methyl tetrahydropyran, 4-methyl tetrahydropyran, 3-methyl tetrahydropyran, and combinations of any two or more thereof;

said second transition metal compound is selected from the group consisting of titanium halides, vanadium halides, titanium hydrocarbyloxytrichlorides, vanadium oxytrichlorides, titanium alkoxides, vanadium alkoxides, and combinations of any two or more thereof;

step (1) of said process is carried out at a temperature in the range of from about 20° C. to about 150° C.;

steps (2) and (3) of said process are each carried out at a temperature in the range of from about 0° C. to about 150° C.;

the molar ratio of said first transition metal compound to said metal halide is in the range of from about 0.1:1 to about 10:1;

the molar ratio of said ether to said Lewis acid is in the range of from about 0.5:1 to about 3:1;

the molar ratio of said Lewis acid to said metal halide is in the range of from about 0.1:1 to about 10:1; and the molar ratio of said second transition metal compound to said metal halide is in the range of from about 0.1:1 to about 50:1.

36. A process according to claim 35 wherein said titanium tetrahydrocarbyloxide is selected from the group consisting of titanium tetramethoxide, titanium dimethoxydiethoxide, titanium tetraethoxide, titanium tetra-n-butoxide, titanium tetrahexyloxide, titanium tetradecyloxide, titanium tetraeicosyloxide, titanium tetracyclohexyloxide, titanium tetrabenzyloxide, titanium tetra-p-tolyloxide, titanium tetraphenoxide, and combinations of any two or more thereof;

said Lewis acid is selected from the group consisting of aluminum trichloride, triethylaluminum, ethylaluminum sesquichloride, ethylaluminum dichloride, diethylaluminum chloride, triethylboron, methylaluminum dibromide, ethylaluminum diiodide, isobutylaluminum dichloride, dodecylaluminum dibromide, dimethylaluminum bromide, diisopropylaluminum chloride, methyl-n-propylaluminum bromide, di-n-octylaluminum bromide, diphenylaluminum chloride, dicyclohexylaluminum bromide, dieicosylaluminum chloride, methylaluminum sesquibromide, ethylaluminum sesquiiodide, and combinations of any two or more thereof;

said ether is selected from the group consisting of tetrahydrofuran, tetrahydropyran, dioxane, trioxane, 2-methyl tetrahydrofuran, 2,5-dimethyl tetrahydrofuran, tetrahydropyran-2-methanol, tetrahydro-4H-pyran-4-ol, 2-methyl tetrahydropyran, 4-methyl tetrahydropyran, 3-methyl tetrahydropyran, and combinations of any two or more thereof; and said second transition metal compound is a titanium halide having the formula of TiX$_q$(OR)$_{4-q}$ wherein X is a halogen; each R is independently selected from the group consisting of alkyl radicals, aryl radicals, alkenyl radicals, alkaryl radicals, aralkyl radicals, and combinations of any two or more thereof; and q is an integer in the range of 1 to 4.

37. A process according to claim 35 wherein said process further comprising depositing a prepolymer on said catalyst composition to prepare a prepolymerized catalyst composition wherein the prepolymer deposited during said prepolymerization is present in an amount in the range of from about 1 to about 80 weight % of said prepolymerized catalyst composition.

38. A process according to claim 36 wherein said first transition metal compound is titanium tetraethoxide; said metal halide is magnesium dichloride; said Lewis acid is selected from the group consisting of aluminum trichloride, ethylaluminum dichloride, ethylaluminum sesquichloride, and combinations of any two or more thereof; said ether is selected from the group consisting of tetrahydrofuran, tetrahydropyran, and combination thereof; said second transition metal compound is titanium tetrachloride; step (1) of said process is carried out at a temperature in the range of from about 30° C. to 120° C.; steps (2) and (3) of said process are each carried out at a temperature in the range of from 10° C. to 150° C.; the molar ratio of said first transition metal compound to said metal halide is in the range of from 0.5:1 to 3:1; the molar ratio of said ether to said Lewis acid is in the range of from about 1:1 to about 2:1; the molar ratio of said Lewis acid to said metal halide is in the range of from 0.2:1 to 3:1; and the molar ratio of said second transition metal compound to said metal halide is in the range of from 1:1 to 20:1.

39. A process according to claim 37 wherein said first transition metal compound is titanium tetraethoxide; said metal halide is magnesium dichloride; said Lewis acid is selected from the group consisting of aluminum trichloride, ethylaluminum dichloride, ethylaluminum sesquichloride, and combinations of any two or more thereof; said ether is selected from the group consisting of tetrahydrofuran, tetrahydropyran, and combination thereof; said second transition metal compound is titanium tetrachloride; step (1) of said process is carried out at a temperature in the range of from about 30° C. to 120° C.; steps (2) and (3) of said process are each carried out at a temperature in the range of from 10° C. to 150° C.; the molar ratio of said first transition metal compound to said metal halide is in the range of from 0.5:1 to 3:1; the molar ratio of said ether to said Lewis acid is in the range of from about 1:1 to about 2:1; the molar ratio of said Lewis acid to said metal halide is in the range of from 0.2:1 to 3:1; and the molar ratio of said second transition metal compound to said metal halide is in the range of from 1:1 to 20:1.

40. A process comprising: (1) combining titanium tetraethoxide, a solvent, and magnesium dichloride at a temperature in the range of from 30° C. to 120° C. to form a solution; (2) contacting said solution with a precipitating agent at a temperature in the range of from 10° C. to 150° C. to form a solid; (3) contacting said solid with titanium tetrachloride at a temperature in the range of from 10° C. to 150° C. to form a solid catalyst; and (4) prepolymerizing said solid catalyst with an alphaolefin to prepare a prepolymerized catalyst, wherein said precipitating agent comprises a Lewis acid and an ether; the molar ratio of titanium tetraethoxide to magnesium dichloride is in the range of from 0.5:1 to 3:1; the molar ratio of said ether to said Lewis acid is in the range of from about 1:1 to about 2:1; the molar ratio of said Lewis acid to magnesium dichloride is in the range of from 0.2:1 to 3:1; the molar ratio of titanium tetrachloride to magnesium dichloride is in the range of from 1:1 to 20:1; the weight % of polymer deposited on said solid catalyst to said prepolymerized catalyst is in the range of from about 5 to about 25%; said Lewis acid is selected from the group consisting of aluminum trichloride, ethylaluminum dichloride, ethylaluminum sesquichloride, and combinations of any two or more thereof; said ether is selected from the group consisting of tetrahydrofuran, tetrahydropyran, and combination thereof; and said prepolymerized catalyst is prepared by polymerizing ethylene onto said solid catalyst.

41. A process according to claim 40 wherein said Lewis acid is aluminum trichloride and said ether is tetrahydrofuran.

42. A process according to claim 40 wherein said Lewis acid is ethylaluminum dichloride and said ether is tetrahydrofuran.

43. A process according to claim 40 wherein said Lewis acid is ethylaluminum sesquichloride and said ether is tetrahydrofuran.

* * * * *